Jan. 24, 1933.   J. W. SILVER   1,895,268
LEAF CATCHER FOR BEET DUMPS, ETC
Filed Aug. 22, 1930   3 Sheets-Sheet 2

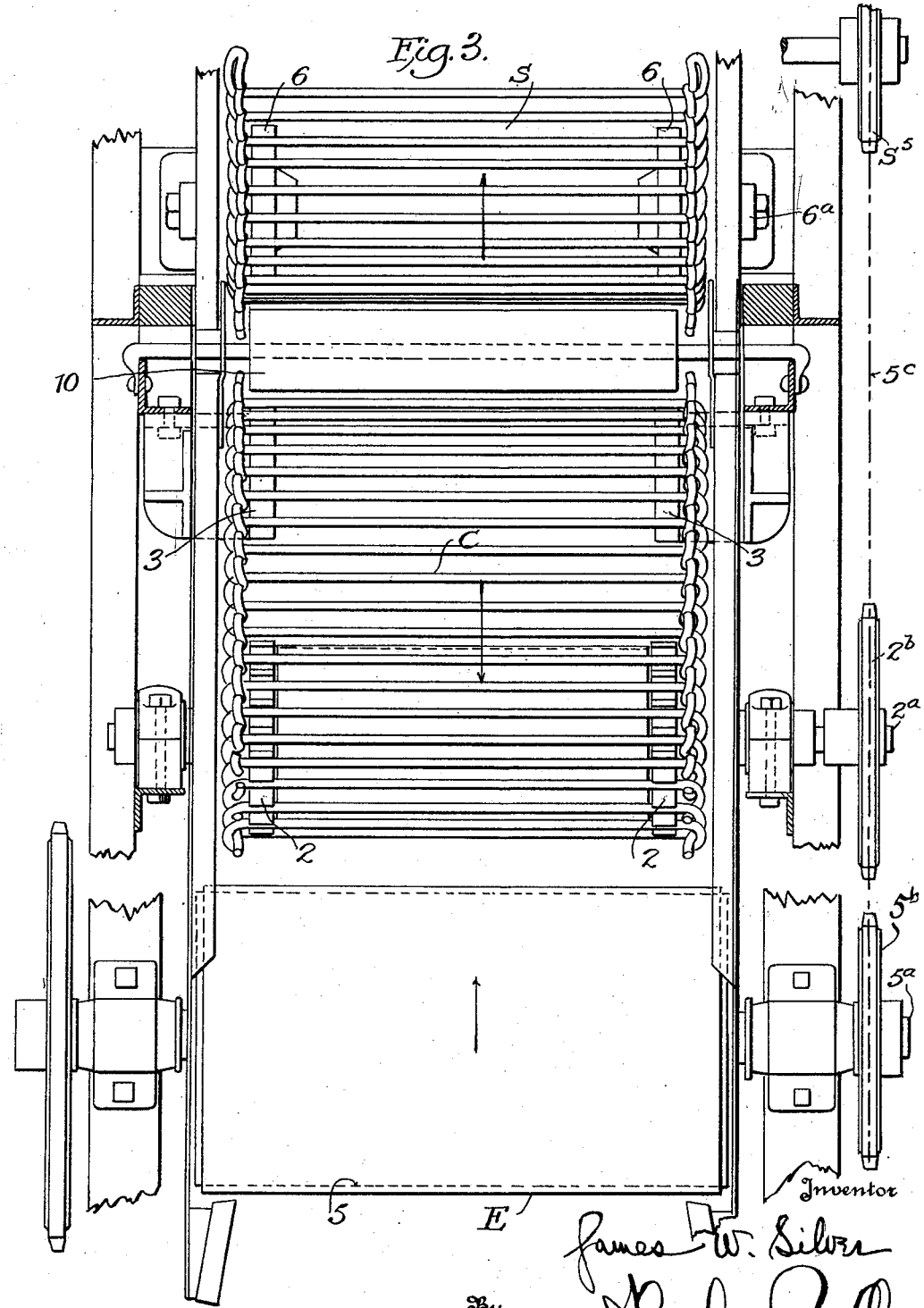

Patented Jan. 24, 1933

1,895,268

UNITED STATES PATENT OFFICE

JAMES W. SILVER, OF OGDEN, UTAH

LEAF CATCHER FOR BEET DUMPS, ETC.

Application filed August 22, 1930. Serial No. 477,169.

This invention relates to beet dumps and machines for handling beets or other vegetables or materials which may have loose leaves mixed therewith, and the principal object is to provide novel means in such machines whereby any detached leaves will be caught and separated from the beets as the latter pass from the conveyor onto the dirt screen, thus preventing the loose leaves from passing onto the dirt screen, said leaves being discharged into the dirt hopper, or other suitable receiver.

The invention resides in such novel means, and more specifically in the novel construction and arrangement of an endless leaf catcher disposed between the head pulley of the beet conveyor and the receiving end of the dirt screening unit, the beets discharged from the conveyor dropping onto a part of such leaf catcher moving in a direction opposite to the direction of the gravital movement of the beets and leaves, the leaf catcher being arranged at such an angle that the beets cannot lodge or rest on the catcher but will continue to drop by gravity downwardly thereover and drop onto the dirt screen, while the loose leaves will be caught by the catcher and discharged thereby into any suitable receptacle.

I will explain the invention with reference to the accompanying drawings which illustrate one practical embodiment thereof; and will summarize in the claims the novel features of construction and novel combinations of parts for which protection is desired.

In said drawings:

Fig. 3 is a top plan view of the leaf catcher and adjacent portions of the conveyor and dirt screen, with arrows indicating the direction of travel of each respective unit.

Figure 1:
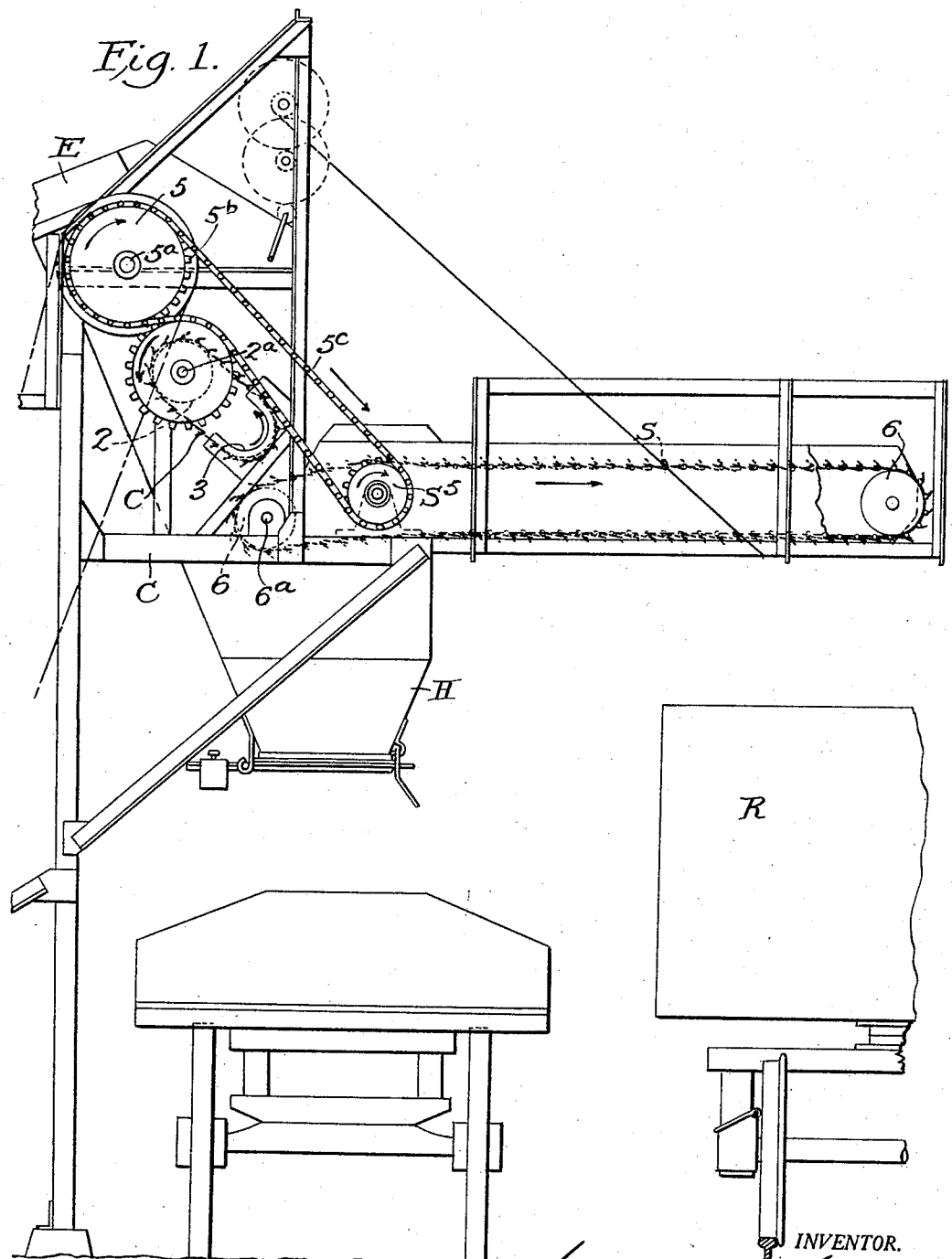
Fig. 1 is a side elevation of part of a beet dump or cleaning mechanism, equipped with my novel leaf catcher.

The invention is applicable to various types of machines and I have illustrated it as used in connection with a well known type of beet dump having an elevator E into which the harvested beets are discharged. The beets together with the loose leaves and soil adhering thereto are ordinarily discharged directly upon an endless dirt screen S moving in the same direction as the conveyor E and usually consisting of an endless conveyor comprising a series of hooked bars evenly spaced and running over idler sprockets 6, the series being driven by sprockets S5 which engage the bars directly, with means S3 whereby the screen is agitated to shake the beets and separate the dirt and refuse therefrom the separated dirt and refuse being usually discharged into a hopper H, and the cleaned beets into a receiver R.

In the operation of the usual dirt screen, it has been found that same does not remove a sufficient quantity of the loose leaves owing to the fact that the natural tendency of the limp loose leaves is to cling or hang to the bars S and travel in the same direction as these bars travel. This allows the leaves to be discharged over the end of the dirt screen with the beets into the railroad car or other receiving apparatus R. Now, it is a well known fact that for a higher percentage of leaves mixed with the beets while in storage the greater is the tendency of the beets to rot. One purpose of my invention therefore is to keep the beets as free from leaves as possible, thereby minimizing this tendency of the beets to rot.

In the construction illustrated an inclined leaf catcher indicated as a unit at C is interposed between the discharge end of the elevator E and the receiving end of the dirt screen S. This leaf catcher preferably comprises a series of transversely disposed parallel bars, interlocking at their ends, forming an endless carrier one end of the series running over sprockets 2 mounted upon a shaft 2a and the other end of the series sliding around stationary circular guides 3 open on each side to allow for easy cleaning, said shaft 2a being disposed parallel with the shaft 5a of the head pulley 5 of the elevator E, and also parallel with the shaft 6a supporting the adjacent end sprockets 6 of the separating screen S.

Preferably a cylindrical shield plate or shell 4 is arranged between the wheels 2 on the shaft 2a, this shield being of such diameter that any leaves which cling to the catcher bars will be dragged around and rubbed against the shield 4, and thereby torn or disintegrated into pieces which will readily detach themselves by gravity from the bars as they descend at the underside of the catcher.

Interposed between the lower end of the leaf catcher C and the adjacent end of the screen S is a deflecting plate 10 sealing the opening between said units to prevent the beets or the like from falling by gravity into hopper H between the units, and for depositing the beets on the screen S.

The shaft 2a of the catcher is preferably driven in a direction opposite to the direction of rotation of the pulley 5 and sprockets 6. Preferably a chain 5c, running around sprocket 5b on the elevator shaft 5a and around sprocket $S^5$ on the drive shaft for the screen S, runs over a sprocket 2b on the leaf catcher shaft 2a whereby shaft 2a is driven by said chain the opposite direction to shaft 5a, as indicated by the arrows in Figs. 1, 2 and 3.

Figure 2:
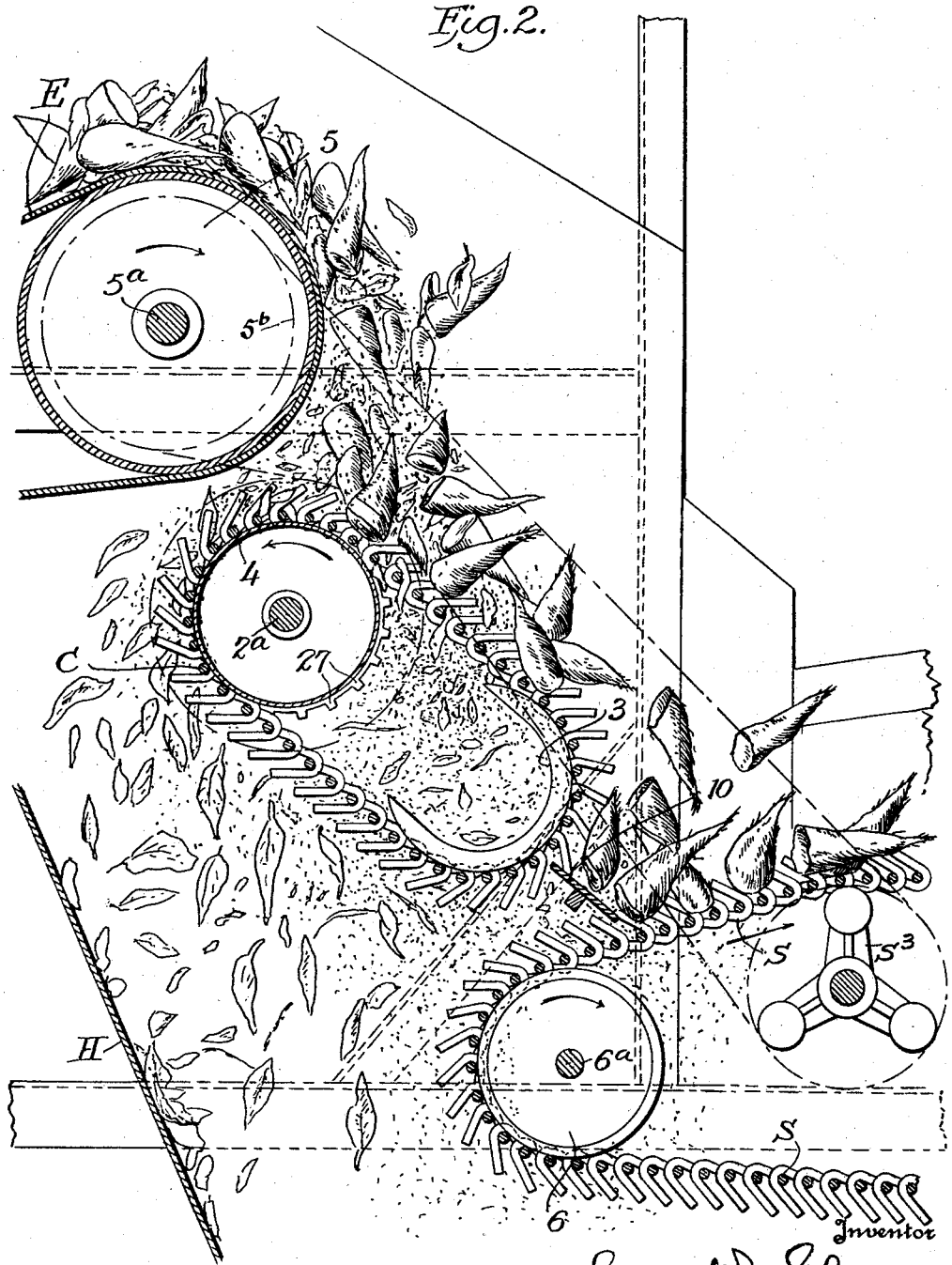
Fig. 2 is an enlarged sectional elevation of the leaf catcher and adjacent portions of the elevating conveyor and the dirt screen.

In operation, the leaf catcher C is disposed at such an inclination that the beets falling on the upper run of the catcher will not rest thereon but will continue by gravity to tumble down thereover and pass by plate 10 off onto the screen S as indicated in Figs. 2 and 3 but the leaves being flabby and of a clinging nature will adhere to or wrap around the upwardly moving bars in the upper run of the catcher and will be carried thereby up and around the shield 4, and will drop off by gravity as the bars descend in the lower run of the catcher. Any leaves which may cling to or wrap around the bars will be rubbed against the shield 4 and be disintegrated and drop off. The leaves falling from the catcher are directed into the hopper H into which the dirt separated from the beets by the screen S is also discharged. Any loose leaves, grass or light clingy matters therefore will be caught by the catcher C and separated from the beets before the latter pass onto the dirt screen S; and consequently said screen S will operate much more efficiently than it could if such leaves were discharged thereon with the beets; and in addition, the separation of the leaves from the beets discharged into the beet receiver R will protect the beets against deterioration and rotting which always accompanies beets placed in storage with leaves mixed therein.

I claim:—

1. In a machine of the character specified having a separating screen and conveyor for discharging beets and leaves onto the screen; an inclined leaf catcher comprising an endless series of parallel bars interposed between the conveyor and screen; spaced sprockets over which the upper bend of the endless series runs, and a substantially arcuate shield conforming with the upper bend of the endless series interposed between the sprockets against which leaves clinging to the bars will be rubbed and disintegrated.

2. In a machine as set forth in claim 1, stationary arcuate guides over which the lower bend of the endless series runs.

3. In a machine of the character specified having a separating screen and conveyor for discharging beets and leaves onto the screen; an upwardly moving inclined leaf catcher comprising an endless series of parallel bars interposed between the conveyor and screen; spaced sprockets over which the upper bend of the catcher runs, and a cylindric shield of the catcher arranged within the bend of the catcher between the sprockets and against which leaves adhering to the bars will be rubbed and disintegrated.

4. In a machine as set forth in claim 3, stationary arcuate guides over which the lower bend of the endless series runs.

5. In a machine of the character specified having a separating screen and conveyor for discharging beets and leaves onto the screen; an inclined leaf catcher comprising an endless series of interconnected parallel bars interposed between the conveyor and screen; spaced sprockets over which the upper bend of the catcher runs, a shield arranged between the sprockets and against which leaves adhering to the bars will be rubbed and disintegrated; stationary arcuate guides over which the lower bend of the catcher runs, and means for rotating the sprockets.

JAMES W. SILVER.